United States Patent [19]

Hopkins

[11] Patent Number: 4,575,101
[45] Date of Patent: Mar. 11, 1986

[54] DEVICE FOR SAFE ON-STREAM ADDITION OF VALVE PACKING

[75] Inventor: Larry D. Hopkins, San Pablo, Calif.

[73] Assignee: Chevron Research Company, San Francisco, Calif.

[21] Appl. No.: 650,318

[22] Filed: Sep. 12, 1984

[51] Int. Cl.[4] .................. F16L 55/10; F16J 15/40
[52] U.S. Cl. .................. 277/72 FM; 137/246.16; 251/214
[58] Field of Search ............ 251/214; 137/246.15, 137/246.16; 277/124, 72 FM

[56] References Cited

U.S. PATENT DOCUMENTS

| | | | |
|---|---|---|---|
| 1,696,723 | 12/1928 | Milliken | 137/246.16 |
| 1,805,155 | 5/1931 | Weeks | 277/72 FM |
| 2,175,867 | 10/1939 | Ballard | 137/246.16 |
| 2,292,906 | 8/1942 | Specht | 137/246.15 |
| 2,304,491 | 12/1942 | Allen | 137/246.16 |
| 2,646,247 | 7/1953 | Hamer | 137/246.16 |
| 3,990,679 | 11/1976 | Boitnott | 251/214 |
| 4,165,080 | 8/1979 | Adams | 277/72 FM |
| 4,174,092 | 11/1979 | MacLeod | 251/214 |
| 4,229,901 | 10/1980 | Wikelski et al. | 277/72 FM |
| 4,364,542 | 12/1982 | Meyer | 277/124 |

Primary Examiner—Robert I. Smith
Attorney, Agent, or Firm—S. R. La Paglia; W. K. Turner

[57] ABSTRACT

A fitting for safe on-stream addition of valve packing which comprises a housing enclosing a first and second chamber each chamber associated with a means for ejecting valve packing, the first chamber being accessible from the valve when the fitting is mounted and also accessible from the second chamber through sealable portals, and the second chamber having a sealable entrance to receive valve packing, thereby enabling safe addition of valve packing to a valve through the valve gland by: sealing the first chamber, adding valve packing to the second chamber and sealing the second chamber, opening the access portal between the chambers and ejecting the valve packing from the second chamber into the first chamber, sealing the access portal between the chambers and opening the portal between the first chamber and the valve, and ejecting the valve packing from the first chamber into the valve.

6 Claims, 1 Drawing Figure

U.S. Patent
Mar. 11, 1986
4,575,101
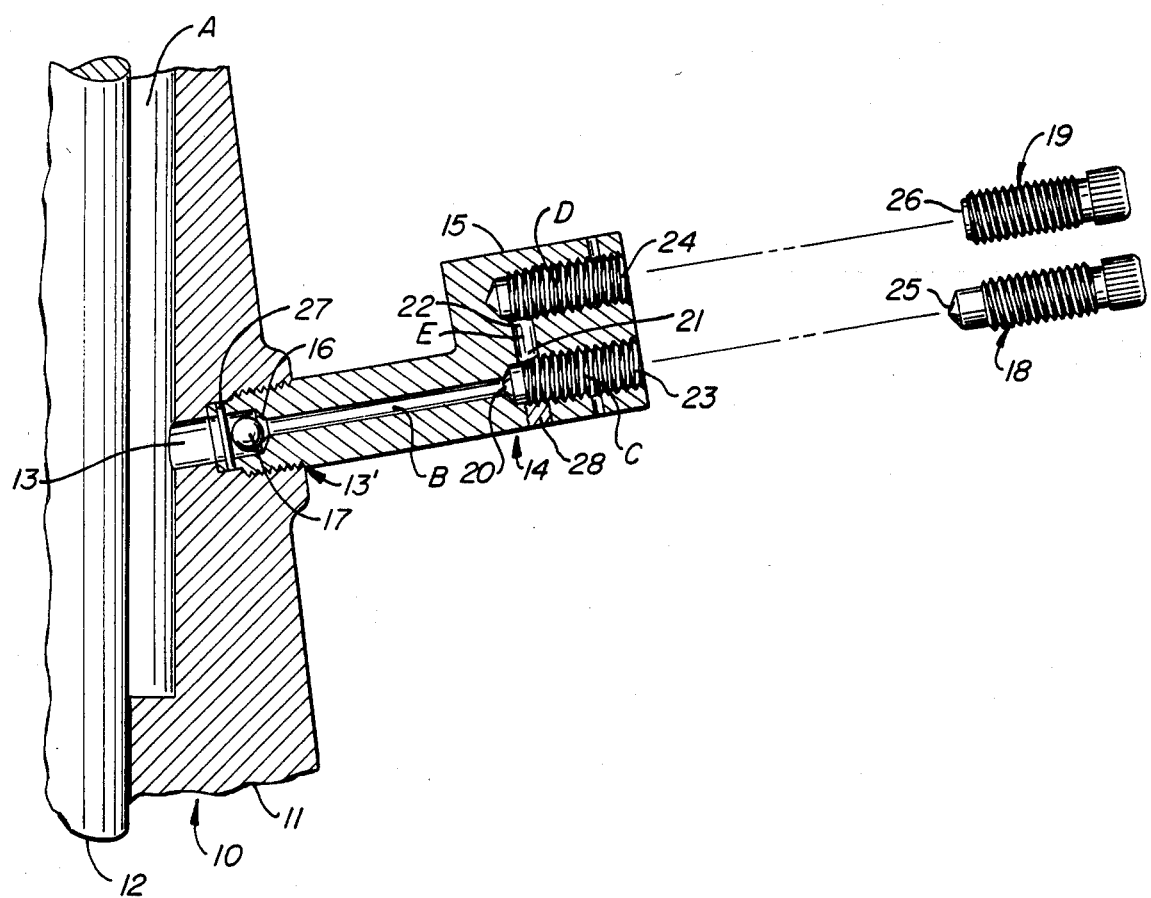

4,575,101

DEVICE FOR SAFE ON-STREAM ADDITION OF VALVE PACKING

BACKGROUND OF THE INVENTION

The present invention relates to fittings used to add valve packing to valves while they remain on-stream. In particular, the fitting of this invention can be safely used to add valve packing to valves in high pressure service.

Using presently available fittings the on-stream addition of valve packing to valves in high pressure service is a difficult and dangerous operation. Conventional pressure mounted fittings, such as the fitting described in U.S. Pat. No. 4,364,542 granted Dec. 21, 1982 to D. S. Meyer, comprise a simple plunger which is depressed to inject valve packing through a valve packing gland into the valve. In order to add valve packing to the fitting the plunger must be completely removed. When the plunger is removed the only protetion against a high pressure blow-out through the valve packing gland and fitting is a seal at the interface between the valve packing gland and the fitting. This seal is typically a ball check. If the ball check fails the consequent blow-out not only results in a shutdown, but also exposes personnel in the vicinity to high pressure fluid.

It is the principle object of this invention to provide an improved fitting which can safely be used to add valve packing to valves in high pressure service while they remain on-stream. This and other objects can be achieved using the fitting described below.

BRIEF DESCRIPTION OF THE DRAWING

The fitting of this invention is exemplified by the preferred embodiment illustrated in the accompanying FIG. 1. FIG. 1 is a longitudinal cross-sectional view of a preferred fitting shown threaded into a valve body.

SUMMARY OF THE INVENTION

This invention provides an improved fitted used to add vlave packing to a valve, especially a valve in high pressure service. In its simplest form the fitting comprises a housing enclosing two chambers each equipped with a means for ejecting valve packing from the chamber. The primary chamber being located so that when the fitting is mounted to a valve the valve packing can be ejected from the primary chamber into a valve packing gland. The primary chamber is accessible from the secondary chamber through a sealable access portal between the two chambers. The secondary chamber is accessible from the outside of the fitting through a sealable loading portal large enough to receive valve packing. Thus, when the fitting is mounted to a valve, the valve packing gland and the primary chamber and the secondary chamber form a series of chambers which can be independently sealed or opened to receive and eject valve packing.

DETAILED DESCRIPTION OF A PREFERRED EMBODIMENT

FIG. 1 illustrates a preferred embodiment of the fitting encompassed by this invention particularly adapted for a threaded connection to the body of a conventional valve.

Referring to FIG. 1, valve 10 is shown in a partial cross-sectional view including a partial view of valve body 11 enclosing valve stem 12 and packing chamber A having valve packing gland 13. Valve stem 12 requires periodic packing by injection of a valve packing through valve packing gland 13 into packing chamber A. In FIG. 1, valve body 11 is machined at the entrance 13' to valve packing gland 13 to accept a male-threaded fitting to inject valve packing.

As pointed out above, this invention relates to fittings which can be mounted to valve 10 at the valve packing gland entrance 13'. Fitting 14, shown in FIG. 1 threaded into valve packing gland entrance 13', is a preferred fitting encompassed by this invention. Housing 15 of fitting 14 encloses a primary chamber B-C having sections B and C and a secondary chamber D. Section B is contiguous with valve packing gland 13 and sealable at the interface 16 of section B and valve packing gland 13 by check ball 17. Section C is a larger diameter section (relative to section B) and is tapered to join with section B at throat 20. In addition, section C is accessible from reduced diameter secondary chamber D through connecting passage E having a sealable access portal 21 at its interface with section C of the primary chamber and a sealable access portal 22 at its interface with secondary chamber D. Accordingly, when mounted to valve 10, fitting 14 provides two separately sealable independent chambers contiguous with valve packing gland 13.

Section C of the primary chamber and secondary chamber D have entrances 23 and 24, respectively, which are female threaded to accept male threaded screw plugs 18 and 19, respectively. Screw plug 18 has a tapered point 25 machined so that when screw plug 18 is fully tightened into section C point 25 seals sections B and C at throat 20 and section C at access portal 21. Screw plug 19 has a truncated point 26 machined so that when screw plug 19 is fully tightened into secondary chamber D access portal 22 is sealed. When screw plugs 18 and 19 are threaded fully or partially into section C of the primary chamber and secondary chamber D, respectively, they also seal entrance portals 23 and 24, respectively. In order to minimize the possibility that screw plugs 18 and 19 are reversed, thus failing to seal orifice 20 should screw plug 19 be threaded into section C, they can optionally be distinguished by differing thread designs and/or plug diameters.

The materials and dimensions of fitting 14, with screw plugs 18 and 19, depend upon the expected service of the fitting. In most applications, 4140 alloy steel per ASTM A-193 GR.B7 is an acceptable material for housing 15. AISI 302 stainless steel is acceptable for the check ball 17, and AISI 303 stainless steel is acceptable for drive pin 27. Primary chamber B-C, secondary chamber D, and connecting chamber E are formed in housing 15 by conventional drilling or casting methods. Plug weld 28 closes the drill hole of connecting chamber E below section C of the primary chamber.

Those familiar with such fittings will appreciate that the present invention is not limited to the embodiment illustrated in FIG. 1 or the materials just mentioned. Suitable fittings advantageously employing features of this invention, such as separately sealable primary and secondary chambers, can be readily obtained by modifying the embodiment illustrated in FIG. 1 or by employing commonly available materials.

Representative dimensions for the fitting illustrated in FIG. 1 are tabulated below:

TABLE I

REPRESENTATIVE DIMENSIONS FOR FITTING
Illustrated in FIG. 1

| Housing 15 | |
|---|---|
| Overall length | 4.5 inches |
| Overall height | 1.75 inches |
| Overall width | 0.875 inches |
| Primary Chamber B-C | |
| Section B length | 3.0 inches |
| Section B diameter | 7/32 inch drill |
| Check ball 17 diameter | 5/16 inch |
| Drive pin 27 diameter | 2/32 inch drill |
| Valve packing gland diameter | 7/16 inch |
| Section C length | 1.5 inches |
| Section C diameter | 29/64 inch tap drill |
| Section C throat taper | 30° |
| Section C threading | ½ inch-20 NF thread, 1¼ inches in |
| Section C location | centered 7/16 inch up from bottom surface of Housing 15 |
| Secondary Chamber D | |
| Overall length | 1.5 inches |
| Chamber diameter | 9/16 inch tap drill |
| Chamber threading | ⅝ inch-18 NF thread, 1¼ inches in |
| Chamber location | centered 7/16 inch down from top surface of Housing 15 |
| Connecting Passage E | |
| Passage diameter | ¼ inch |
| Location | centered 1 3/16 inches in from surface of Housing 15 |
| Screw plug 18 | |
| Overall length | 2¼ inches |
| Threading | ½ inch-20 NF thread |
| Plug head | ½ inch sq.-⅜ inch-⅛ inch neck |
| Taper point angle | 30° |
| Screw plug 19 | |
| Overall length | 1⅝ inches |
| Threading | ⅝ inch-18 NF thread |
| Plug head | ½ inch sq.-⅜ inch length-1/83 inch neck |

The fitting of this invention is primarily useful to inject valve packing into a valve through a valve packing gland. However, it can also be used to inject lubricants, sealants, or other injectable materials into valves. Suitable materials are well-known and commercially available.

The fitting is particularly beneficial when mounted to a valve in high pressure service. The presence of a series of independent chambers within the fitting provides a safety chamber between the operator and the high pressure stock controlled by the valve at all times during the addition of injectable material to the fitting as well as during injection. This is more clearly understood from a description of the operation of the fitting illustrated in FIG. 1. As illustrated in FIG. 1, injectable material can be added to secondary chamber D of fitting 14 while primary chamber B-C is sealed against a possible blow-out at check ball 17 and thus serves as a safety chamber during addition of material to fitting 14. Similarly, injectable material can be ejected from primary chamber B-C of fitting 14 into valve packing gland 13 of valve 10 while secondary chamber D is sealed against a possible blow-out at access portal 21 and thus serves as a safety chamber during injection of material into valve 10. After mounting fitting 14 with screw plugs 18 and 19 in place, the steps to operate fitting 14 are: (1) screw plug 18 is tightened into section C of primary chamber B-C until tapered point 25 seats at throat 20 of section C to provide a positive seal, at the same time screw plug 18 seals across access portal 21; (2) with primary chamber B-C now blocking valve packing gland 13 at both check ball 17 and throat 20, screw plug 19 is removed opening connecting passage E and secondary chamber D; (3) injectable material is loaded into connecting chamber E and secondary chamber D though entrance portal 24 leaving some volume to reinsert screw plug 19; (4) screw plug 19 is reinserted sealing entrance portal 24; (5) screw plug 18 is partially withdrawn until throat 20 and access portal 21 are opened; (6) screw plug 19 is tightened injecting material into primary chamber B-C through connecting passage E at access portal 21, and eventually sealing across access portal 22; and (7) screw plug 18 is re-tightened injecting material and valve packing gland 13 pass check ball 17. This operation is repeated until the desired amount of material is injected.

The foregoing description of a preferred embodiment of this invention and its operation illustrates the invention and is not intended to limit the invention to that precise embodiment. The illustrated embodiment will, in fact, suggest changes in form which can be made within the scope of the following claims without departing from the defined invention.

I claim:

1. A fitting safely used to add an injectable material to a valve in high pressure service which comprises a housing enclosing a first and a second sealable chamber, each chamber associated with a means for ejecting said injectable material from said chamber; and which fitting when mounted to said valve has a first sealable portal between its first chamber and said valve and also a second sealable portal between its first chamber and its second chamber, said second chamber having a sealable entrance portal to receive said injectable material; said chamber and portals being arranged and equipped with seals in such a manner that each portal can be independently sealed or opened thereby permitting the addition of said injectable material to said valve by a succession of injections from said second chamber to said first chamber to said valve while at all times having at least two portals sealed between the fluid in said valve and the outside of said entrance portal of said second chamber.

2. A fitting according ro claim 1 wherein the means for ejecting said injectable material associated with said second chamber is a screw plug which when inserted into said entrance portal of said second chamber seals said entrance portal and which when tightened reduces the volume of said second chamber thereby ejecting said injectable material from said second chamber into said first chamber.

3. A fitting according to claim 2 wherein said first chamber has a third sealable portal opening from said first chamber to the outside of said housing and wherein said means for ejecting said injectable material associated with said first chamber is a screw plug which is inserted into said third portal of said first chamber and which plug when so inserted seals said third portal and when tightened reduces the volume of said first chamber thereby ejecting said injectable material from said first chamber into said valve and when fully tightened also seals said second portal between said first and second chambers, and when partially withdrawn opens said second portal between said first and second chambers.

4. A fitting according to claim 3 wherein the screw plugs have at least one dimension which differs sufficiently to avoid interchanging said screw plugs.

5. A fitting according to claim 1 wherein said first chamber is connected to said second chamber through a connecting passage having a portal at each end.

6. The fitting as illustrated in FIG. 1 comprising a housing (14) enclosing a first and second sealable chamber (B-C and D) connected by a passage (E); said chambers being associated with threaded screw plugs (18 and 19) which when inserted into the entrance portals (23 and 24) of said chambers (B-C and D), seal said portals (23 and 24) and which when tightened into said chambers (B-C and D) reduce the volume of said chambers eventually sealing the portals (21 and 22) of the passage (E) connecting said chambers; and said chamber (B-C) having two sections, the first section (B) being of smaller diameter than the second section (C), said sections being joined by a tapered throat (20) which is selaed by the tapered point of said screw plug (18) fully tightened into said section of larger diameter (C), and said section of smaller diameter (B) being the section from which an injectable material is ejected into a valve and said section being fitted at the valve interface with a check ball (17).

* * * * *